US 11,356,383 B2

(12) United States Patent
Leach et al.

(10) Patent No.: US 11,356,383 B2
(45) Date of Patent: Jun. 7, 2022

(54) CLOUD TRANSLATION MECHANISM

(71) Applicant: Hewlett Packard Enterprise Development LP, Houston, TX (US)

(72) Inventors: Kenneth Leach, Austin, TX (US); Jorge Daniel Cisneros, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 14 days.

(21) Appl. No.: 16/906,267

(22) Filed: Jun. 19, 2020

(65) Prior Publication Data

US 2021/0399994 A1    Dec. 23, 2021

(51) Int. Cl.
| | |
|---|---|
| *H04L 67/133* | (2022.01) |
| *H04L 41/0226* | (2022.01) |
| *H04L 47/765* | (2022.01) |
| *H04L 47/70* | (2022.01) |
| *H04L 47/783* | (2022.01) |
| H04L 67/08 | (2022.01) |

(52) U.S. Cl.
CPC .......... *H04L 47/765* (2013.01); *H04L 47/783* (2013.01); *H04L 47/828* (2013.01); *H04L 67/40* (2013.01); *H04L 41/0226* (2013.01); *H04L 67/08* (2013.01)

(58) Field of Classification Search
CPC ......... H04L 45/52; H04L 67/40; H04L 69/08; H04L 12/66; H04L 14/0226; H04L 41/0226; G06F 9/54; G06F 9/547
See application file for complete search history.

(56) References Cited

U.S. PATENT DOCUMENTS

| | | | |
|---|---|---|---|
| 10,528,551 B2 | 1/2020 | Li et al. | |
| 10,699,668 B1* | 6/2020 | Gupta | G06F 3/1454 |
| 2005/0257258 A1* | 11/2005 | Kinoshita | H04L 67/28 |
| | | | 713/168 |
| 2014/0281708 A1* | 9/2014 | Adam | G06F 11/1479 |
| | | | 714/18 |
| 2016/0191461 A1* | 6/2016 | Wang | H04L 65/1069 |
| | | | 709/227 |

(Continued)

FOREIGN PATENT DOCUMENTS

CN      108769250 A    11/2018

OTHER PUBLICATIONS

Chinthaka Deshapriya, "OpenStack Metal-as-a-Service," May 19, 2017, pp. 1-18, Retrieved from the Internet on Jun. 8, 2020 at URL: <slideshre.net/openedasia/openstack-metaservice>.

(Continued)

*Primary Examiner* — Tom Y Chang
(74) *Attorney, Agent, or Firm* — Trop, Pruner & Hu, P.C.

(57) ABSTRACT

A system to facilitate communication between a cloud system and an edge server is described. The system includes one or more processors to execute a translation service to receive a first request operation from a cloud service, wherein the first request operation comprises a first communication protocol supported by the cloud service, translate the first request operation to a second communication protocol supported by a first edge server, wherein the second communication protocol is different from the first communication protocol and transmit the translated first request operation to the first edge server.

20 Claims, 6 Drawing Sheets

(56) References Cited

U.S. PATENT DOCUMENTS

| | | |
|---|---|---|
| 2019/0005576 A1 | 1/2019 | Mick et al. |
| 2019/0141119 A1* | 5/2019 | Bernat ................ H04L 41/5006 |
| 2019/0227949 A1* | 7/2019 | Bernat .................... G06F 12/16 |
| 2019/0349426 A1* | 11/2019 | Smith ................... H04L 67/104 |
| 2020/0328948 A1* | 10/2020 | Nayyar ............... H04L 41/0803 |
| 2021/0203617 A1* | 7/2021 | Johansson ............. H04L 47/828 |
| 2021/0211509 A1* | 7/2021 | Ly .......................... H04L 67/16 |

OTHER PUBLICATIONS

Hewlett Packard Enterprise Development LP, "Redfish API implementation on HPE servers with iLO RESTful API," Technical White Paper, Dec. 2017, pp. 1-9.

Matti Dahlbom, "Cloud Conversion, Part 1: Cloud Endpoints API," May 8, 2017, pp. 1-6, Retrieved from the Internet on Jun. 9, 2020 at URL: <ovik.com/news/cloud-conversion-1/>.

Shweta Gupta, "Configuring Hyperledger Fabric consodium with Gracie Blockchain Cloud Service (OBCS)," May 12, 2019, p. 1-11, Retrieved from the Internet on Aug. 9, 2020 at URL:<medium.com@shwartagupta9/configuring-hyperledger-fabric-consortium-with-oracle-blockchain-cloud-service-obcs-516271s104d>.

Tinkerbell, "Provision and Manage Bare Metal, Anywhere," 2020, pp. 1-2.

\* cited by examiner

CLOUD TRANSLATION MECHANISM

BACKGROUND

A cloud service may refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as an example, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
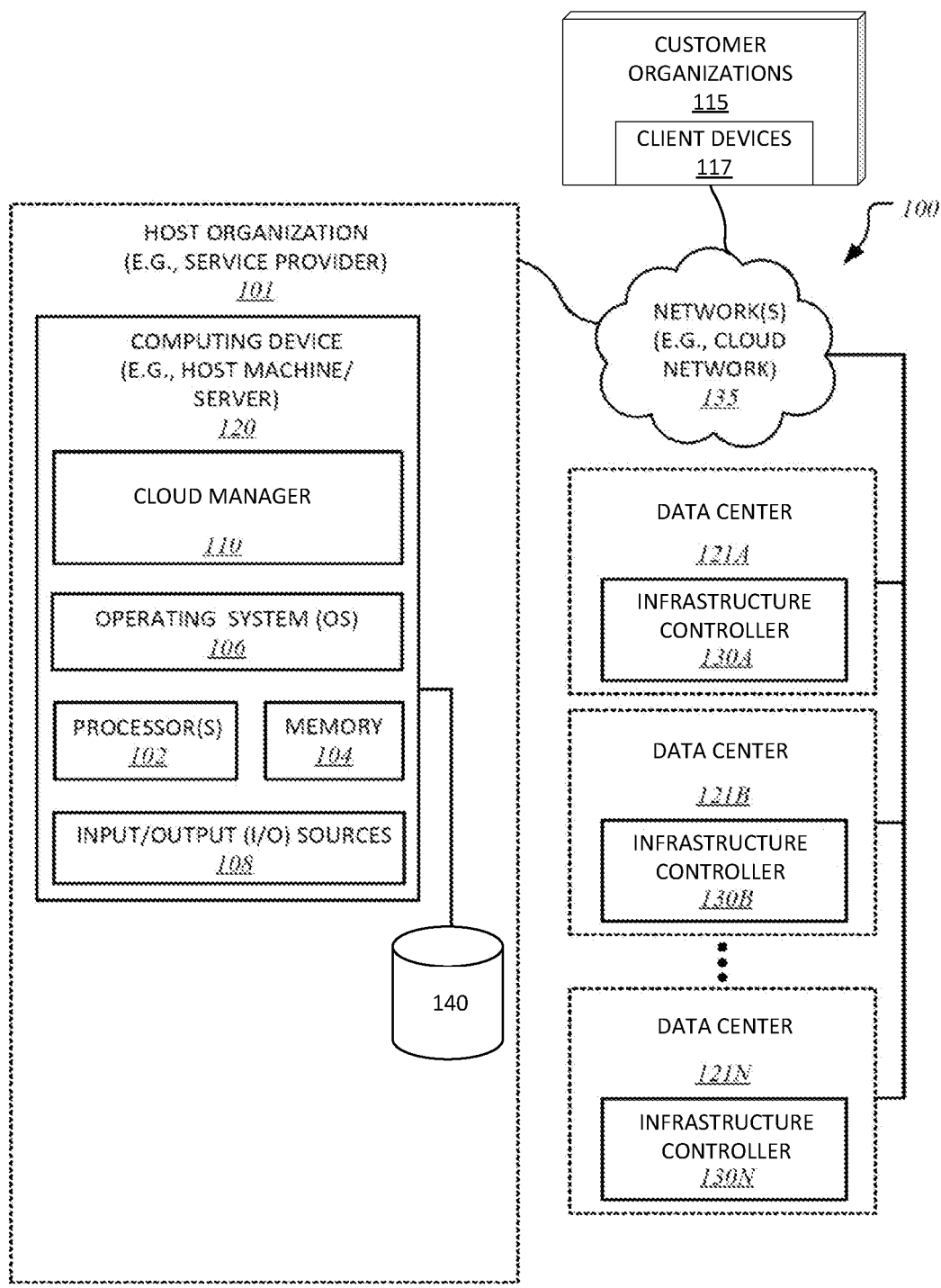
FIG. 1 illustrates one embodiment of an infrastructure management system.

As discussed above, resources may be implemented to provide a cloud service. However, cloud services are increasingly incorporating edge nodes including edge devices (e.g., servers and storage) into cloud platforms to provide compute and storage capabilities in close proximity to a location that needs those resources (e.g., a location of end users). Edge servers often incorporate baseboard management controllers (BMCs) to facilitate out-of-band management of the servers (e.g., use of management interfaces for managing and networking equipment). However, cloud management services and edge servers may not support the same communication protocols. Thus, out-of-band management of the servers by a cloud management service requires a separate controller physically coupled to each edge server to enable communication between a cloud management service and edge servers to perform out-of-band management.

In embodiments, a translation service is provided as a SaaS or PaaS to facilitate cloud management of edge server communication. In such embodiments, the translation service receives an operation request (or request operation or request) from a cloud service (or source) in a communication protocol supported by the cloud service and translates the request to a communication protocol supported by the edge server before transmitting the translated request to the edge server (or destination). In further embodiments, the translation service receives an operation response (or response) to the request from the edge server in the communication protocol supported by the edge server and translates the response to the communication protocol supported by the cloud service for transmission to the source. In yet further embodiments, the translation service supports a plurality of communication protocols (e.g., Hypertext Transfer Protocol Secure (HTTPS), Representational state transfer (REST), gRPC Remote Procedure Calls (gRPC), etc.). Thus, the translation service enables a cloud service to simultaneously communicate with two or more edge servers that support different communication protocols.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a REST application program interface (API), or some other system software proxy that facilitates communication between the BMC and applications. The BMC may have hardware level access to hardware devices located in a server chassis including system memory. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of an infrastructure management system 100 having a computing device 120 employing a resource cloud manager (or cloud manager) 110. In one embodiment, cloud manager 110 is a remote configuration service hosted within a SaaS that is provided to manage the configuration and update each of a plurality of on-premise infrastructure resource appliances (e.g., racks) located in different data centers. In a further embodiment, cloud manager 110 enables the configuration of infrastructure resources on behalf of a plurality of client (or customer) organizations by a client.

As shown in FIG. 1, computing device 120 includes a host server computer serving as a host machine for employing cloud manager 110, which provides a platform to configure infrastructure resources. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 117, etc. Computing device 120 further includes processor(s) 102, memory 104, input/output ("I/O") sources 108, such as touchscreens, touch panels, touch pads, virtual or regular keyboards, virtual or regular mice, etc. In one embodiment, cloud manager 110 may be executed by a separate processor application specific integrated circuit (ASIC) than processor 102. In a further embodiment, cloud manager 110 may act out of band, and may be on a separate power rail, from processor 102. Thus, cloud manager 110 may operate on occasions in which processor 102 is powered down.

In one embodiment, host organization 101 may further employ a production environment that is communicably interfaced with client devices 117 at customer organizations 115 through host organization 101. Client devices 117 may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 115. In some embodiments, host organization 101 receives input and other requests from a plurality of customer organizations 115 over one or more networks 135; for example, incoming data, or other inputs may be received from customer organizations 115 to be processed using database system 140.

In one embodiment, each customer organization 115 is an entity selected from a group consisting of a separate and distinct remote organization, an organizational group within host organization 101, a business partner of host organization 101, a customer organization 115 that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 117. The request interface may further support the return of response packets or other replies and responses in an outgoing direction from host organization 101 to one or more client devices 117.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 117, over one or more networks, such as network(s) 135.

In one embodiment, host organization 101 provides services to configure resources within data centers 121A-121N. Data centers 121A-121N represent separate infrastructure resource providers that offer services to provide hardware resources (e.g., compute, storage, network elements, etc.) or software resources. In a further embodiment, one or more of providers 121A-121N may provide a virtualization of its resources as a virtualization infrastructure for virtualization of its resources. In this embodiment, computing device 120 resources and/or one or more of the physical infrastructure resources provided by providers 121A-121N may be configured as one or more Point of Developments (PODs) (or instance machines), where an instance machine (or instance) comprises a cluster of infrastructure (e.g., compute, storage, software, networking equipment, etc.) that operate collectively.

According to one embodiment, each of the providers data centers 121A-121N implement one or more on-premise infrastructure controller 130 to control its respective resources. In this embodiment, each infrastructure controller 130 controls an on-premise infrastructure appliance, which provides access to infrastructure devices within the appliance, or to one or more infrastructure elements (e.g., an instance of managed infrastructure) of its respective infrastructure resources. In one embodiment, each infrastructure controller 130 comprises a software-defined networking (SDN) controller that provide on-premises infrastructure management of physical infrastructure resources, such as an Infrastructure Management System. However other embodiments may implement different infrastructure management systems.

Figure 2:
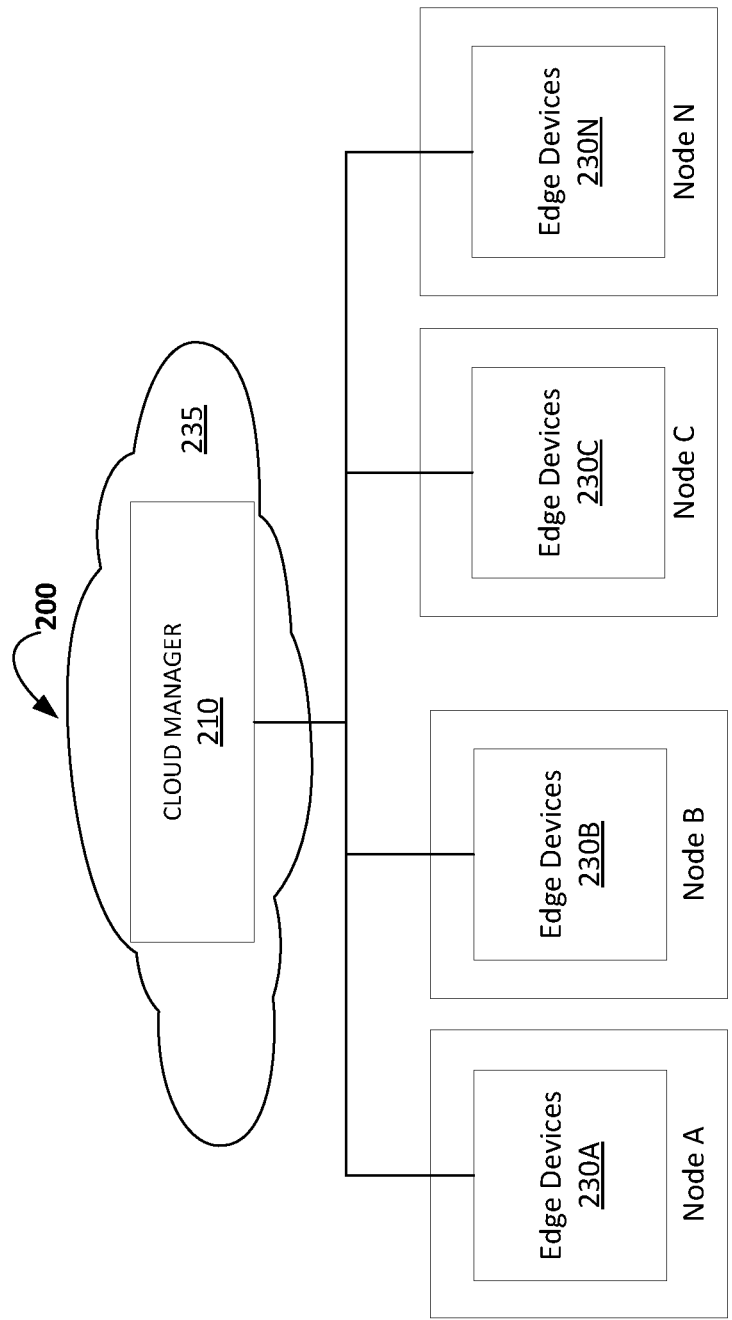
FIG. 2 is a block diagram illustrating another embodiment of an infrastructure management system.

FIG. 2 is a block diagram illustrating an infrastructure management system 200. As shown in FIG. 2, infrastructure management system 100 may include the management of edge devices 230 (e.g., 230A, 230B, 230C-230N) at nodes A-N via a cloud manager 210. According to one embodiment, cloud manager 210 is communicatively coupled to each edge device 230 via cloud network 235. For example, cloud manager 210 is a cloud service (e.g., as discussed in FIG. 1) that is configured to manage and configure all of the edge devices 230, as will be discussed in more detail below.

Figure 3A:
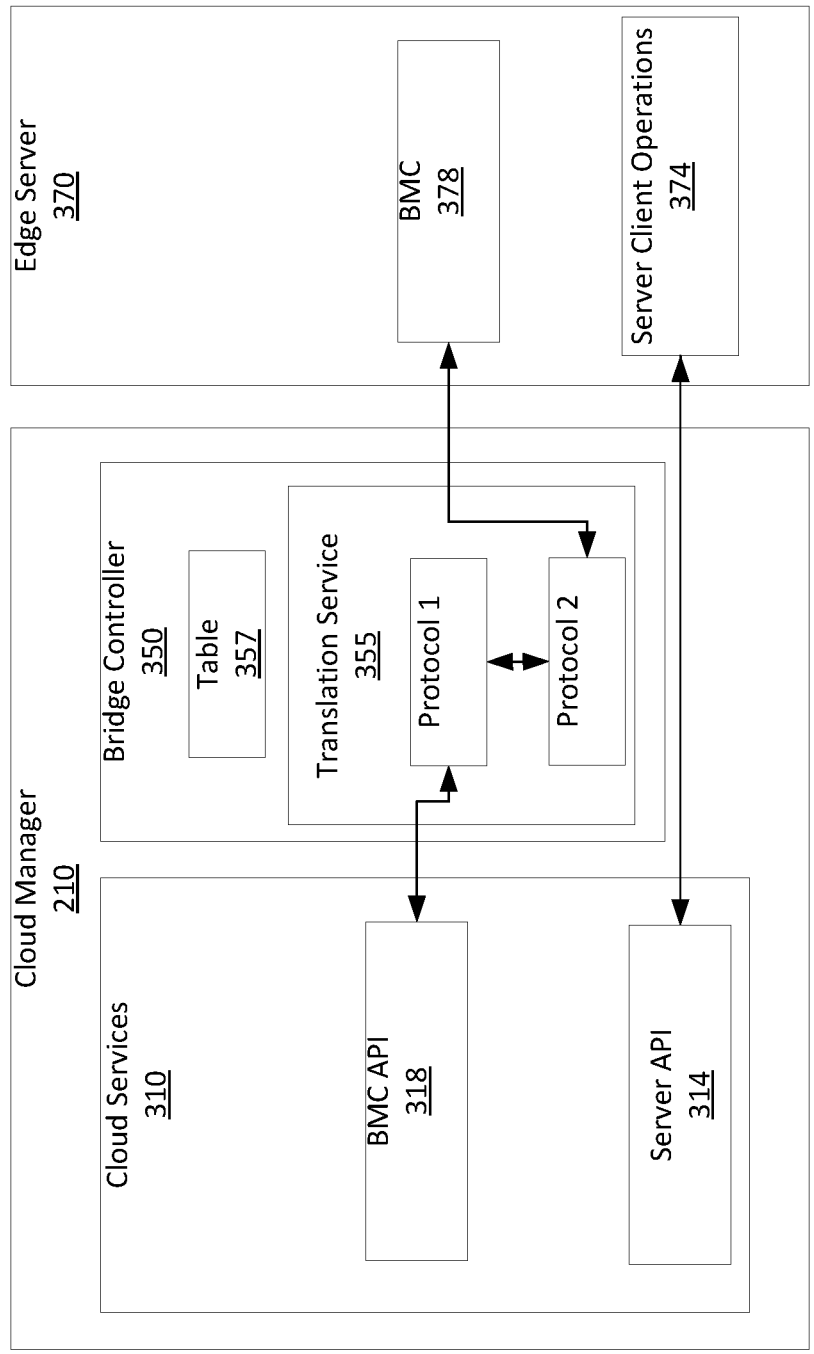
FIGS. 3A & 3B are block diagrams illustrating one embodiment of a resource cloud manager coupled to an edge server.

FIG. 3A illustrates one embodiment of a cloud manager 210 coupled to an edge server 370. As shown in FIG. 3A, cloud manager 210 includes a server API 314 and a BMC API 318. According to one embodiment, server API 314 comprises a gRPC protocol interface that facilitates communication with edge server 370 to perform server-client operations 374. In such embodiments, the server-client operations 374 are executed by a processor and include operations, such as erase drives, setup Redundant Array of Inexpensive Disks (RAID), update firmware, set Basic Input/Output System (BIOS), etc.

BMC API 318 is implemented to communicate with BMC 378 at edge server 370 to perform management and provisioning services. BMC API 318 communicates with BMC 378 to perform server 370 management operations (e.g., power-up, reset, update firmware, set BIOS, set Boot disk, get serial number, etc.). Similar to API 314, BMC API 318 may also comprise a gRPC interface to facilitate communication with BMC 378. However in many instances, BMC 378 may implement a different type of interface. For example, BMC 378 may operate according to a Representational state transfer (REST) protocol interface.

According to one embodiment, cloud manager 210 includes a bridge controller 350 that implements a translation service 355 to translate between a communication protocol supported by BMC API 318 (or protocol 1 (e.g., gRPC)) and a communication protocol supported by BMC 378 (or protocol 2 (e.g., REST)). Thus, translation service 355 operates as a communication bridge in instances in which cloud services 310 and BMC 378 do not support the same communication protocol. In further embodiments, translation service 355 supports other communication protocols (e.g., Hypertext Transfer Protocol Secure (HTTPS), WebSocket (WS), WebSocket Secure (WSS), etc.) in addition to gRPC and REST.

In one embodiment, translation service 355 includes a translation table 357 that is implemented to perform the translation between protocol 1 operations and protocol 2 operations. In this embodiment, translation table 357 comprises a database including a plurality of request and response operations supported by each communication protocol. Additionally, the translation table 357 database maintains an index of related operations between a communication protocol that is supported by BMC API 318 and communication protocols supported by each of a plurality of BMCs 378.

For example, a protocol 1 (e.g., gRPC) power on API request may be indexed to a protocol 2 (e.g., REST) power on API request supported at a first BMC 378, and indexed to a protocol 3 (e.g., HTTP) power on API request supported at a second BMC 378. Thus, translation is performed by replacing the protocol 1 request format with the protocol 2 request format (or the protocol 3 format). A similar translation process is performed from protocol 2 (or protocol 3) to protocol 1 for responses received at translation service 355 from a BMC 378. In other embodiments, translation service 355 may implement different types of translation mechanisms. For example, translation service 355 may employ a trained machine learning algorithm to facilitate the translations.

In one embodiment, translation service 355 may simultaneously perform translations between BMC API 318 and a BMC 378 at multiple edge servers 370. In such an embodiment, each communication channel between translation service 355 and a BMC 378 comprises a secure channel (e.g., a Transport Layer Security (TLS) protocol tunnel) to transmit requests and responses. As a result, different cloud service sources may use translation service 355 simultaneously to provision a plurality of edge servers 370 supporting various communication protocols.

According to one embodiment, translation service 355 provides a fallback process to support edge servers 370 that do not have a persistent and reliable network connectivity to cloud manager 210. In such an embodiment, translation service 355 immediately translates requests received from the source to the supported protocol and transmits the requests to the destination edge server 370. In instances in which the connection between translation service 355 and the BMC 378 has been interrupted (e.g., BMC 378 does not receive a request due to a network disconnect or timeout), translation service 355 waits to be contacted by BMC 378 once the connection has been re-established.

In this embodiment, translation service 355 receives an update message from BMC 378 requesting an operation that is to be performed. In response, translation service 355 transmits a status update message to BMC API 318 requesting a most recent operation requested to be performed on the BMC 378. Subsequently, BMC API 318 repeats the transmission of the original request to translation service 355 for translation and transmission to BMC 378. Thus, there is no need for translation service 355 to cache server states, operations to perform, or any other data that by required by edge server 370 or BMC API 318.

Figure 3B:
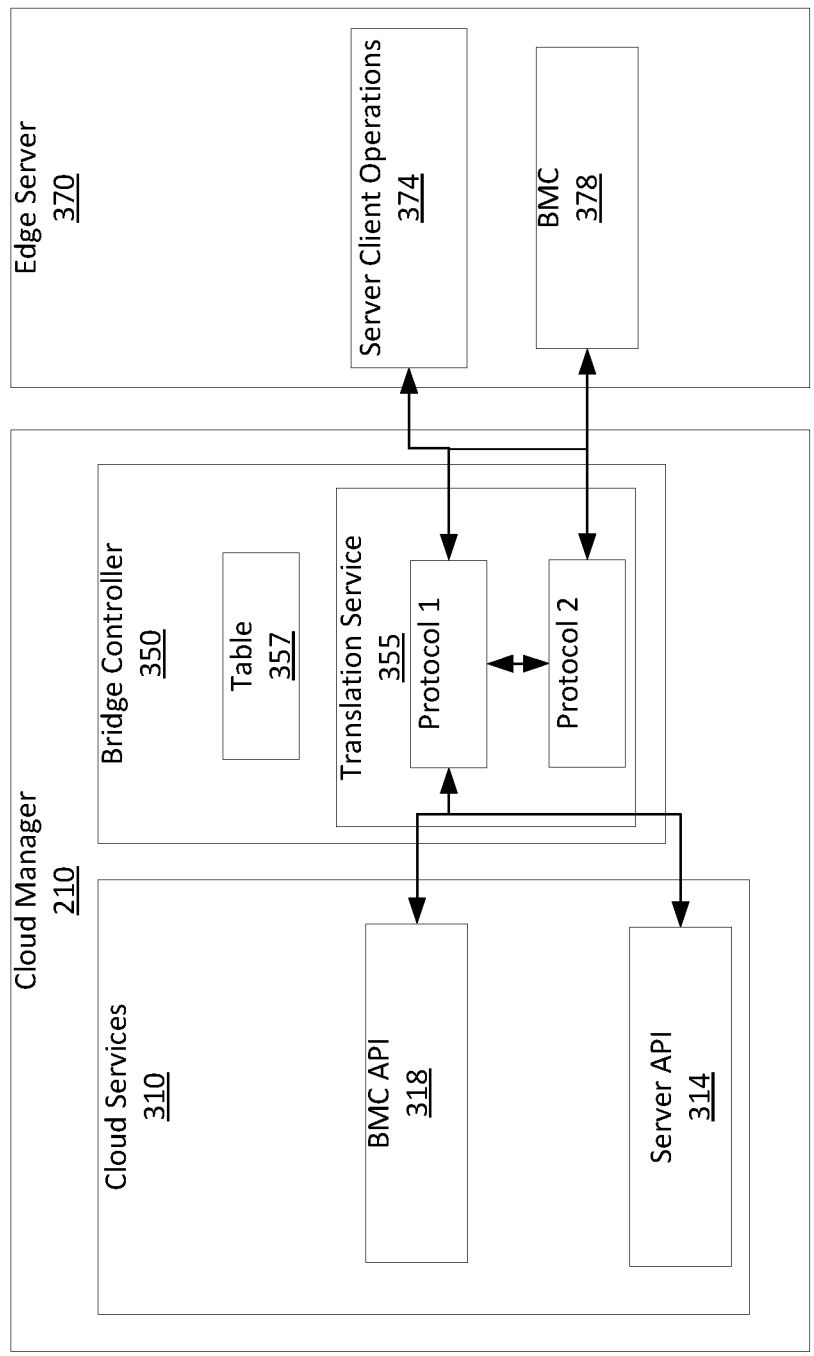

FIG. 3B illustrates another embodiment of cloud manager 210 coupled to an edge server 370. In this embodiment, translation service 355 may also be implemented to facilitate communication between server API 314 and server-client operations 374. In one embodiment, translation service 355 may facilitate communication between server API 314 and server-client operations 374 may communicate using the same protocol (e.g., protocol 1). However in other embodiments, translation service 355 may facilitate the communication by performing translation operations similar to discussed above.

Figure 4:
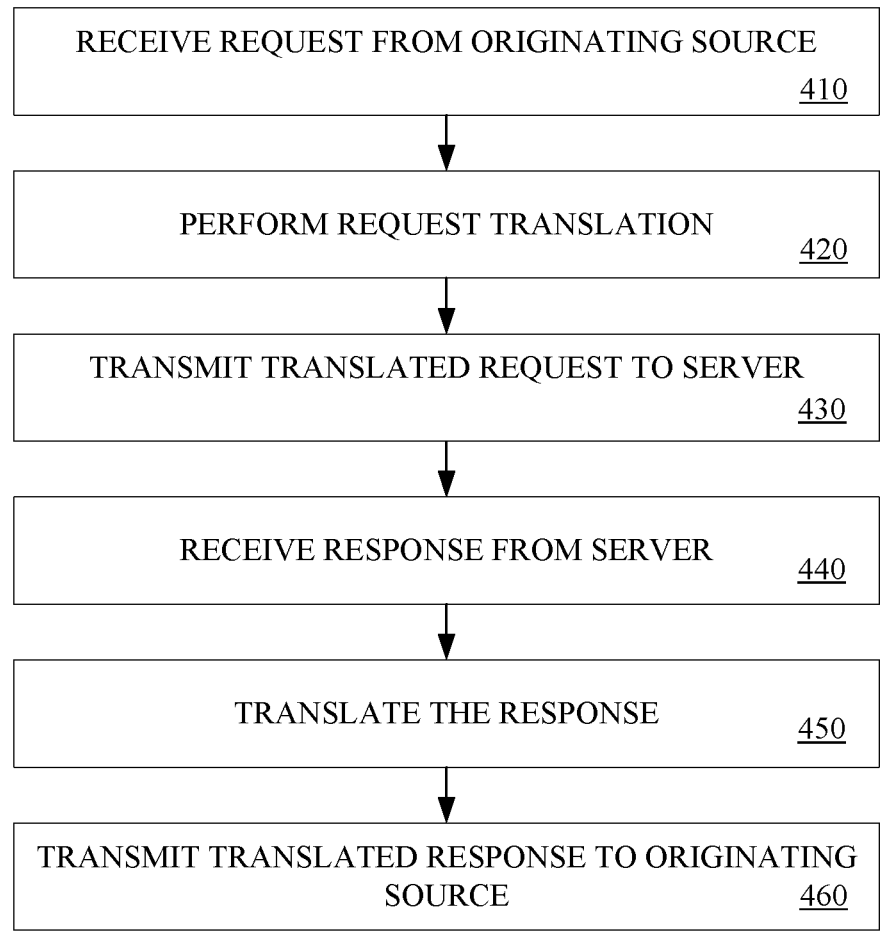
FIG. 4 is a flow diagram illustrating one embodiment of a translation process.

FIG. 4 is a flow diagram illustrating one embodiment of a translation process. At processing block 410, a request (e.g., gRPC request) is received from a cloud service from an originating source (e.g., via BMC API 318) for an edge server 370. At processing block 420, translation service 355 translates the request (e.g., from protocol 1 to protocol 2 (REST)). At processing block 430, the translated request is transmitted to the edge server 370 (e.g., via a TLS tunnel). As discussed above, the request is received and processed at edge server 370 via BMC 378.

In one embodiment, the processing comprises forwarding the request to a destination process managed by BMC 378. The destination process performs one or more of the BMC operations discussed above and generates a response. Once processing has been completed the generated response is transmitted from edge server 370 and received at translation service 355, processing block 440. At processing block 450, translation service 355 translates the response (e.g., from protocol 2 to protocol 1). At processing block 460, the translated response is transmitted to the originating source.

Figure 5:
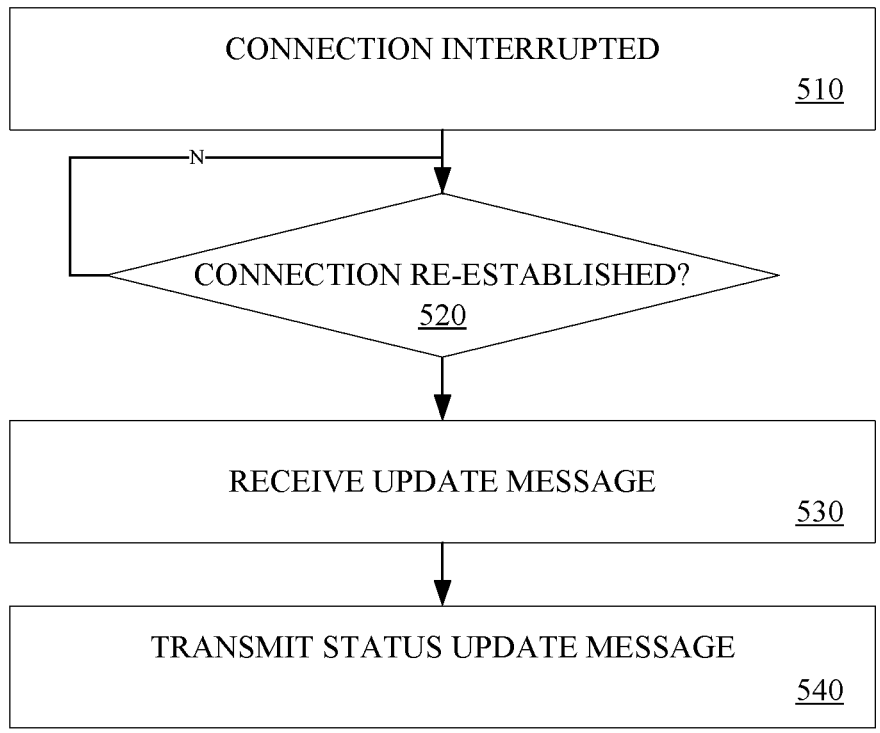
FIG. 5 is a flow diagram illustrating one embodiment of a fallback process.

As mentioned above, a fallback process is performed by translation service 355 for instances in which the connection with BMC 378 has been interrupted. FIG. 5 is a flow diagram illustrating one embodiment of a fallback process. At processing block 510, the connection between translation service 355 and BMC 378 is determined to be interrupted (e.g., after a translated request has been transmitted to BMC 378). At decision block 520, a determination is made as to whether the connection has been re-established. If not, control is returned to decision block 520. Upon a determination that the connection has been re-established, translation service 355 receives an update message from BMC 378 requesting an operation that is to be performed, processing block 530. At processing block 540, translation service 355 transmits a status update message to BMC API 318 requesting the most recent operation requested to be performed on the BMC 378. Subsequently, the translation process described above with reference to FIG. 4, is repeated.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate communication between a cloud system and an edge server, comprising:
   one or more processors to execute a translation service; and
   a non-transitory machine readable medium storing instructions of the translation service, the instructions when executed causing the one or more processors to:
      maintain a translation table comprising a plurality of request operations and response operations supported by each of a plurality of communication protocols;
      receive a first transmission of a first request operation from a cloud service directed to a baseboard management controller (BMC) of a first edge server, wherein the first request operation comprises a first communication protocol, wherein the first communication protocol is not supported by the BMC;
      translate the first request operation into a translated first request operation comprising a second communication protocol supported by the BMC of the first edge server, wherein the second communication protocol is different from the first communication protocol;
      transmit the translated first request operation to the BMC via a network connection;
      in response to a determination that the network connection to the BMC has been interrupted and re-established, wait for an update message from the BMC;
      receive the update message from the BMC via the re-established connection, the update message requesting an operation to be performed by the BMC;
      in response to a receipt of the update message from the BMC, send, to the cloud service, a request for a repeated transmission of the first request operation; and
      after sending the request for the repeated transmission to the cloud service, receive the repeated transmission of the first request operation from the cloud service.

2. The system of claim 1, wherein the translation service further to:
   receive a first response from the BMC, wherein the response comprises the second communication protocol; and
   translate the first response to the first communication protocol.

3. The system of claim 2, wherein the translation service further to transmit the translated first response to the cloud service.

4. The system of claim 3, wherein the translation service further to:
   receive a second request operation from the cloud service comprising the first communication protocol;
   translate the request operation to a third communication protocol supported by a second BMC of a second edge server, wherein the third communication protocol is different from the first and second communication protocols; and
   transmit the second translated request operation to the second BMC.

5. The system of claim 4, wherein the translation service further to:
   receive a second response from the second BMC, wherein the response comprises the third communication protocol;
   translate the second response to the first communication protocol; and
   transmit the second translated response to the cloud service.

6. The system of claim 5, wherein the translation table comprises a database having a plurality of request operations and response operations supported by each of the first, second and third communication protocols.

7. The system of claim 6, wherein the database comprises an index of related operations between the first communication protocol and the second communication protocol, and the first communication protocol and the third communication protocol.

8. The system of claim 7, wherein the first communication protocol comprises gRPC Remote Procedure Calls (gRPC), the second communication protocol comprises Representational state transfer (REST), and the third protocol comprises one of Hypertext Transfer Protocol Secure (HTTPS), Web Socket (WS), Web Socket Secure (WSS).

9. The system of claim 3, wherein the BMC receives the translated request operation and generates the first response.

10. The system of claim 1, wherein the plurality of request operations in the translation table comprise a server power-up operation, a server reset operation, and a server firmware update operation.

11. The system of claim 1, wherein the first request operation is a server power-up operation performed by the BMC.

12. A non-transitory machine-readable medium storing instructions which, when executed by a processor, cause the processor to:
   maintain a translation table comprising a plurality of request operations and response operations supported by each of a plurality of communication protocols;
   receive a first transmission of a first request operation from a cloud service directed to a baseboard management controller (BMC) of a first edge server, wherein the first request operation comprises a first communication protocol, wherein the first communication protocol is not supported by the BMC;
   translate the first request operation into a translated first request operation comprising a second communication protocol supported by the BMC of the first edge server, wherein the second communication protocol is different from the first communication protocol;
   transmit the translated first request operation to the BMC via a network connection;
   in response to a determination that the network connection to the BMC has been interrupted and re-established, wait for an update message from the BMC;
   receive the update message from the BMC via the re-established connection, the update message requesting an operation to be performed by the BMC;
   in response to a receipt of the update message from the BMC, send, to the cloud service, a request for a repeated transmission of the first request operation; and
   after sending the request for the repeated transmission to the cloud service, receive the repeated transmission of the first request operation from the cloud service.

13. The non-transitory machine-readable medium of claim 12, storing instructions which, when executed by a processor, cause the processor to execute a cloud services resource cloud manager to:
   receive a first response from the BMC, wherein the response comprises the second communication protocol;
   translate the first response to the first communication protocol; and
   transmit the translated first response to the cloud service.

14. The non-transitory machine-readable medium of claim 13, storing instructions which, when executed by a processor, cause the processor to:
   determine that a connection between the translation service and the first edge server has been interrupted;
   receive an update message from the first edge server requesting an operation that is to be performed; and
   transmit a status update message to the cloud service.

15. The non-transitory machine-readable medium of claim 14, storing instructions which, when executed by a processor, cause the processor to receive the first request operation from the cloud service in response to the status update message.

16. The non-transitory machine-readable medium of claim 13, wherein the first communication protocol comprises gRPC Remote Procedure Calls (gRPC), and the second communication protocol comprises Representational state transfer (REST).

17. A method to facilitate infrastructure management, comprising:
   maintaining, by a translation device, a translation table comprising a plurality of request operations and response operations supported by each of a plurality of communication protocols;
   receiving, by the translation device, a first transmission of a first request operation from a cloud service directed to a baseboard management controller (BMC) of a first edge server, wherein the first request operation comprises a first communication protocol, wherein the first communication protocol is not supported by the BMC;
   translating, by the translation device, the first request operation into a translated first request operation comprising a second communication protocol supported by the BMC of the first edge server, wherein the second communication protocol is different from the first communication protocol;
   transmitting, by the translation device, the translated first request operation to the BMC via a network connection;
   in response to a determination that the network connection to the BMC has been interrupted and re-established, waiting, by the translation device, for an update message from the BMC;
   receiving, by the translation device, the update message from the BMC via the reestablished connection, the update message requesting an operation to be performed by the BMC;
   in response to a receipt of the update message from the BMC, sending, by the translation device to the cloud service, a request for a repeated transmission of the first request operation; and
   after sending the request for the repeated transmission to the cloud service, receiving, by the translation device, the repeated transmission of the first request operation from the cloud service.

18. The method of claim 17, further comprising:
   receiving a first response from the BMC, wherein the response comprises the second communication protocol;
   translating the first response to the first communication protocol; and
   transmitting the translated first response to the cloud service.

19. The method of claim 17, wherein the plurality of request operations in the translation table comprise a server power-up operation, a server reset operation, and a server firmware update operation.

20. The method of claim 17, wherein the first request operation is a server power-up operation performed by the BMC.

* * * * *